US009267795B2

(12) United States Patent
Frank et al.

(10) Patent No.: US 9,267,795 B2
(45) Date of Patent: Feb. 23, 2016

(54) SYSTEM WITH A MEASUREMENT BAR AND A MEASUREMENT DEVICE

(75) Inventors: Michael Frank, Bretten (DE); Peter Wolf, Leinfelden-Echterdingen (DE); Nicolas Gros, Stuttgart (DE); Heiko Fuellemann, Asperg (DE); Ilyes Ben Hassine, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 13/981,625

(22) PCT Filed: Jan. 9, 2012

(86) PCT No.: PCT/EP2012/050205
§ 371 (c)(1),
(2), (4) Date: Nov. 15, 2013

(87) PCT Pub. No.: WO2012/104112
PCT Pub. Date: Aug. 9, 2012

(65) Prior Publication Data
US 2014/0075767 A1    Mar. 20, 2014

(30) Foreign Application Priority Data
Feb. 2, 2011   (DE) .................... 10 2011 003 495

(51) Int. Cl.
*G01C 3/06*       (2006.01)
*G01C 9/02*       (2006.01)
*G01C 3/08*       (2006.01)
*G01C 15/00*      (2006.01)
(52) U.S. Cl.
CPC .. *G01C 3/06* (2013.01); *G01C 3/08* (2013.01); *G01C 9/02* (2013.01); *G01C 15/008* (2013.01)

(58) Field of Classification Search
CPC .............. G01C 3/06; G01C 9/02; G01C 9/18; G01C 15/10
USPC ....... 33/451, 290, 375, 263, 275 R, 333, 334, 33/354, 370, 374
See application file for complete search history.

(56) References Cited

U.S. PATENT DOCUMENTS

| 5,713,135 | A  | * | 2/1998 | Acopulos ........................ 33/451 |
| 6,041,510 | A  |   | 3/2000 | Huff |
| 6,167,630 | B1 | * | 1/2001 | Webb .............................. 33/354 |
| 7,028,411 | B1 | * | 4/2006 | Kasche ........................... 33/451 |

(Continued)

FOREIGN PATENT DOCUMENTS

| CN | 1533497 A       | 9/2004 |
| DE | 20 2010 013 902 U1 | 1/2011 |
| EP | 1 395 050 A1    | 3/2004 |

OTHER PUBLICATIONS

International Search Report corresponding to PCT Application No. PCT/EP2012/050205, mailed Apr. 4, 2012 (German and English language document) (5 pages).

*Primary Examiner* — Christopher Fulton
(74) *Attorney, Agent, or Firm* — Maginot, Moore & Beck LLP

(57) ABSTRACT

The disclosure proceeds from a system with a measurement bar and a measurement device, having at least one computation unit, an inclination measurement means and an electronic distance measurement means. The disclosure proposes that the system have a coupling apparatus which is provided for coupling the measurement bar and the measurement device such that they can be separated by an operator.

11 Claims, 2 Drawing Sheets

(56) References Cited

U.S. PATENT DOCUMENTS

| | | | |
|---|---|---|---|
| 7,281,335 B2* | 10/2007 | Feliciano | 33/374 |
| 7,363,719 B2* | 4/2008 | Levinson et al. | 33/384 |
| 7,562,463 B2* | 7/2009 | Vaes | 33/374 |
| 7,802,372 B1* | 9/2010 | Silberberg | 33/451 |
| 7,866,055 B2* | 1/2011 | Zhang et al. | 33/365 |
| 7,900,368 B2* | 3/2011 | Cerwin | 33/645 |
| 8,621,760 B2* | 1/2014 | Norelli | 33/371 |
| 2003/0079357 A1* | 5/2003 | Liao | 33/374 |
| 2006/0021237 A1* | 2/2006 | Marshall et al. | 33/290 |
| 2009/0113733 A1 | 5/2009 | Hale | |
| 2013/0333233 A1* | 12/2013 | Esposito | 33/370 |

* cited by examiner

SYSTEM WITH A MEASUREMENT BAR AND A MEASUREMENT DEVICE

This application is a 35 U.S.C. §371 National Stage Application of PCT/EP 2012/050205, filed on Jan. 9, 2012, which claims the benefit of priority to Serial No. DE 10 2011 003 495.1, filed on Feb. 2, 2011 in Germany, the disclosures of which are incorporated herein by reference in their entirety.

BACKGROUND

The disclosure proceeds from a system with a measuring bar and a measuring device as described herein.

A system with a measuring bar and a measuring device which has at least one arithmetic logic unit, an inclination measuring means and an electronic distance measuring means has already been proposed. The measuring bar and the measuring device are integrally formed in this case.

SUMMARY

The disclosure proceeds from a system with a measuring bar and a measuring device which has at least one arithmetic logic unit, an inclination measuring means and an electronic distance measuring means.

It is proposed that the system have a coupling device which is provided so that an operator can releasably couple the measuring bar and the measuring device. "Measuring bar" is to be understood, in particular, as a device which has at least two stop areas which are spaced apart from one another and define a measuring plane. The stop areas are preferably formed as parallel, in particular continuous surfaces. In particular, the stop areas are arranged spaced apart from one another at least partially by at least 20 cm, preferably at least 40 cm, with particular preference at least 60 cm. The two stop areas are advantageously subareas of an, in particular continuous stop surface arranged on the plane. The measuring bar preferably has at least two stop surfaces. The measuring bar is preferably at least partially made from a material which seems sensible to the person skilled in the art, but preferably of plastic and/or advantageously of aluminum. In particular, an "arithmetic logic unit" is intended to mean a unit having an information input, an information processing means and an information output. The arithmetic logic unit advantageously has at least one processor, input interfaces, output interfaces and/or advantageously operating programs and/or computing routines stored in a memory of the arithmetic logic unit. An "inclination measuring means" is intended, in particular, to be understood as a means which is provided at least in order to determine an alignment about at least one axis relative to a direction of gravity and, in particular, to provide at least one information item relating thereto, preferably in electronic form. The inclination measuring means preferably measures an alignment about at least two axes, preferably three axes, which are preferably aligned perpendicular to one another. In particular, a "distance measuring means" is intended to be understood as a means which is provided in order to determine a distance between a reference point and a measurement object. In this context, "electronic" is intended, in particular, to mean that the distance measuring means outputs at least one electric parameter with at least one information item relating to a measured distance. The arithmetic logic unit is preferably provided for the purpose of reading out these parameters and/or receiving them. In particular, a "coupling device" is intended to be understood as a device which is provided, in particular, in order to align the measuring bar and the measuring device in a provided position in a fashion immobile relative to one another. The coupling device preferably has a coupling means which seems sensible to the person skilled in the art, but preferably a means for establishing a non-positive closure and/or a positive closure. In particular, the coupling means is formed as a latching element, preferably as a locking element, with particular preference as an eccentric element. "Provided" is intended to be understood as, in particular, specifically programmed, designed and/or equipped. In particular, the expression "capable of being released by an operator" is intended to mean that the connection of the coupling device is designed such that the operator can separate the connection without destruction and advantageously without any tools. Owing to the design of the system, the measuring device can be used conveniently with particular versatility. A high measuring accuracy, particularly as regards an inclination measurement, is possible with a simple design.

In a further refinement, it is proposed that the measuring bar have a main extent which is at least twice as large as a main extent of the measuring device, the result being to enable a particularly high measuring accuracy, in particular as regards an inclination measurement. In particular, a "main extent" is to be understood as a maximum extent, specifically advantageously parallel to at least one stop surface. The main extent of the measuring bar is advantageously at least three times, preferably four times as large as the main extent of the measuring device.

Moreover, it is proposed that the measuring bar have a coupling means of the coupling device which is provided for fastening the measuring device on the measuring bar, as a result of which it is possible for the measuring device to dispense with an optically visible coupling means of complicated design. The coupling means is preferably provided so as to effect a fastening force on an outer surface of the measuring device. With particular preference, the coupling means exerts a fastening force on an area of the outer surface which cannot be distinguished from other areas of the outer surface.

Furthermore, it is proposed that the measuring device have a bar detecting means which in at least one operating state provides at least one information item relating to a coupling to the measuring bar, thus enabling an inclination to be measured with particular ease and with accuracy owing to an improved calibration. A "bar detecting means" is intended, in particular, to be understood as a means with a sensor which appears sensible to the person skilled in the art and serves to detect a connection to the measuring bar, but advantageously to a capacitive sensor, an electric contact, an inductive sensor, in particular a Hall sensor, and/or an optical sensor. The bar detecting means preferably has at least one computing routine which is executed by the arithmetic logic unit in at least one operating state. It is particularly preferred for the bar detecting means to be designed as a computing routine which is executed by the arithmetic logic unit in at least one operating state. In particular, an "information item relating to a coupling" is intended to be understood as an information item which is at least partially dependent on a connection of the measuring bar to the measuring device. The term "provide" is intended, in particular, to mean that the bar detecting means is provided so as to transmit the information and/or output it to be read out.

Furthermore, it is proposed that the distance measuring means be provided so as to determine a distance by means of a laser beam, thus enabling the attainment of high accuracy and great convenience. A "laser beam" is intended, in particular, to mean a light beam with an aperture angle of less than 2 degrees, preferably less than 1 degree, with particular preference less than 0.5 degrees. The light beam preferably has at least 75% of its emitted energy in the aperture angle.

In an advantageous design, it is proposed that the bar detecting means be provided in order to determine the information at least with the aid of the laser beam so that it is possible to dispense with an additional sensor, in particular only for detecting a coupling between the measuring device and the measuring bar. The phrase "to determine the information at least with the aid of the laser beam" is intended, in particular, to mean that the information of the bar detecting means is a function of a parameter determined by the laser beam.

Furthermore, it is proposed that the arithmetic logic unit be provided in order to fix a stop surface as a function of a parameter of the inclination measuring means, thus enabling a particularly convenient operation with a simple design. The measuring device and/or preferably the measuring bar advantageously has/have at least two, advantageously at least three differently aligned stop surfaces. A "stop surface" is intended to be understood, in particular, as a surface which touches the measurement object when an inclination is being measured thereon. The stop surface preferably defines a measuring plane whose alignment determines the inclination measuring means. During a measurement, the inclination measuring means advantageously determines an inclination of the measuring plane relative to a direction of gravity. "Fix" is, in particular, intended in this context to mean that the arithmetic logic unit fixes a measuring plane from at least one parameter, in particular of the inclination measuring means, relative to which the inclination measuring means determines an alignment.

Furthermore, it is proposed that the arithmetic logic unit be provided in order to activate an angle measuring mode as a function of the information via a coupling with the measuring bar, as a result of which the operator need not activate the angle measuring mode by hand. "Angle measuring mode" is intended, in particular, to mean a mode in which at least one information item relating to an alignment of the arithmetic logic unit is evaluated and/or, in particular, is advantageously output to the operator, as a priority. In addition to the angle measuring mode, the arithmetic logic unit preferably has a distance measuring mode in which a measured distance is output with priority.

It is proposed, in addition, that the arithmetic logic unit have at least one memory which in at least one operating state comprises at least one calibration data set for calibrating the inclination measuring means, thus enabling particularly accurate inclination measurements. A "memory" is intended, in particular, to mean a means that is provided in order to store at least one information item, advantageously independently of a power supply. In particular, a "calibration data set" is intended to mean an information item which describes a difference between a direction of gravity determined by the sensor and an actual direction of gravity.

Furthermore, it is proposed that the arithmetic logic unit have at least one calibration routine which is provided in order to create a calibration data set of the inclination measuring means, thereby enabling particularly accurate inclination measurements to be achieved under various conditions of use. In particular, it is advantageously possible to detect and/or compensate a malfunction of the inclination measuring means. A "calibration routine" is intended, in particular, to mean a program which can be executed by a processor of the arithmetic logic unit. In particular, it is to be understood under the term "check" that the calibration routine determines a difference between a direction, determined by the sensor, of gravity and an actual direction of gravity, and compares it with the calibration data set. The calibration routine preferably changes the calibration data set after the checking. Alternatively or in addition, the routine could change the calibration data set without checking.

Furthermore, it is proposed that the measuring bar have an optical means which is provided in order to direct a laser beam so as to detect a coupling, thus rendering it possible to achieve convenient manipulation with a low design outlay. An "optical means" is intended, in particular, to be understood as a means which is provided in order to deflect a laser beam. The optical means preferably has at least one reflector. In particular, the phrase "to detect a coupling" is intended to mean that the optical means deflects the laser beam in the case of a coupling, thus enabling detection of the coupling, specifically between the measuring bar and the measuring device.

In addition, it is proposed that the measuring bar comprise a recess which is provided in order to hold the measuring device in at least one operating state, as a result of which the measuring device is advantageously protected during a measurement of inclination. A "recess" is intended, in particular, to be understood as an area delimited by the measuring bar which, in at least one operating state, the measuring device surrounds by more than 180 degrees, advantageously more than 270 degrees, on at least one plane which is advantageously aligned parallel to the main extent. The recess preferably takes up more than 50%, with particular preference more than 75% of the measuring device.

BRIEF DESCRIPTION OF THE DRAWINGS

Further advantages emerge from the following description of the drawings. An exemplary embodiment is illustrated in the drawings. The drawings, the description and the claims contain numerous features in combination. The person skilled in the art will expediently also individually consider the features and combine them to form sensible further combinations.

In The Drawings.

DETAILED DESCRIPTION

Figure 1:
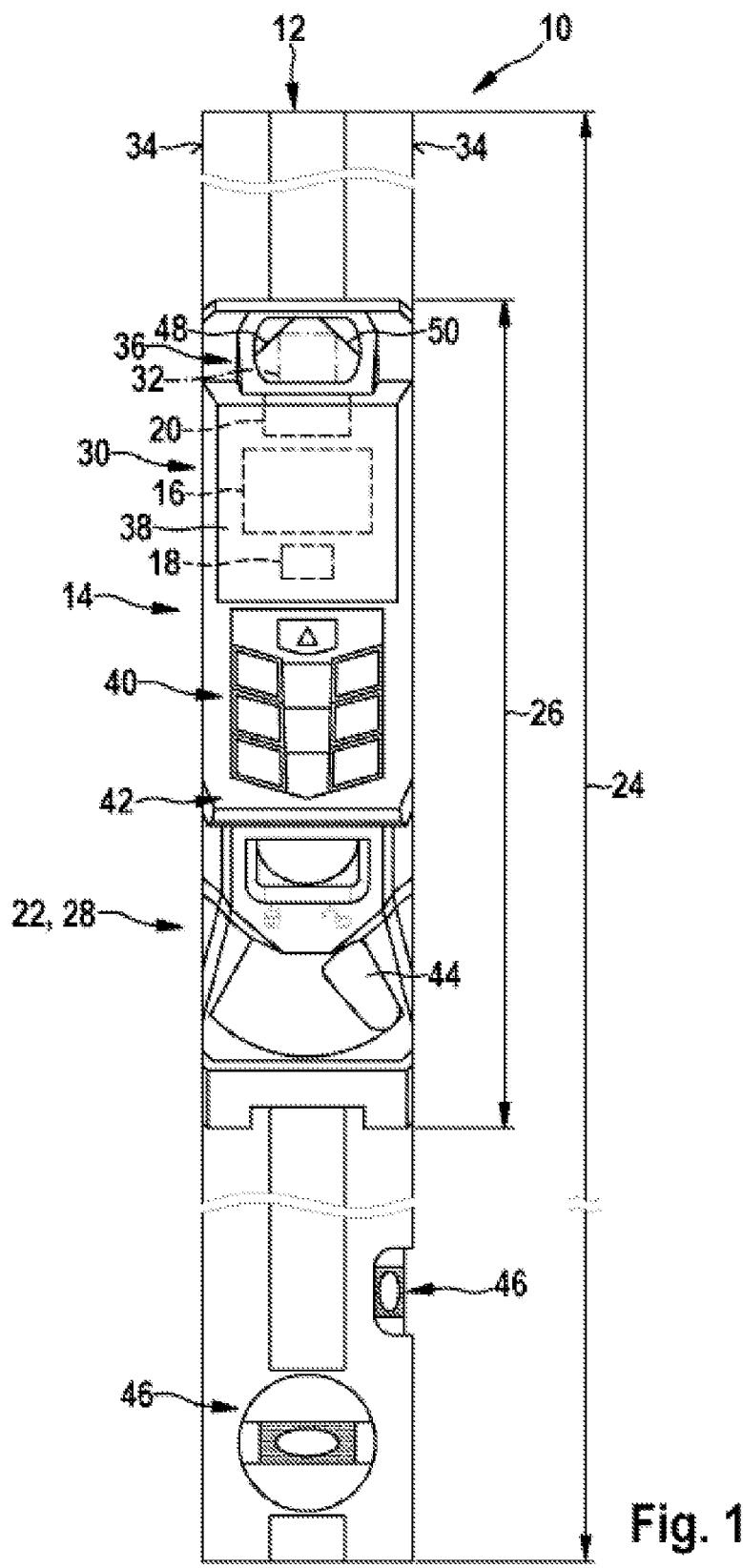
FIG. 1 shows a system according to the disclosure with a measuring bar and a measuring device, in a plan view.
Figure 2:
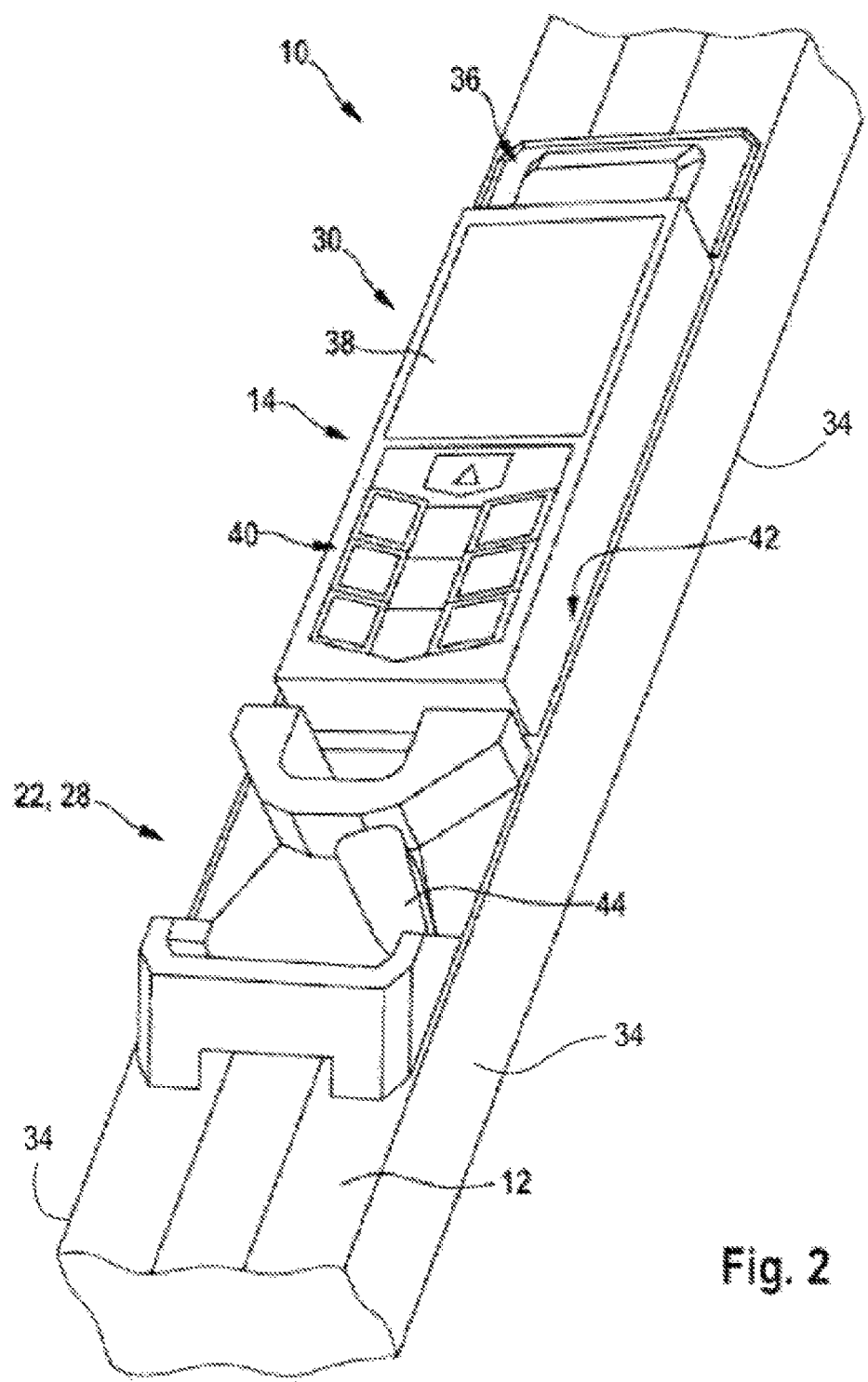
FIG. 2 shows the system from FIG. 1 in perspective illustration.

FIG. 1 and FIG. 2 show a system according to the disclosure with a measuring bar 12 and a measuring device 14. The measuring device 14 has an arithmetic logic unit 16, an inclination measuring means 18, an electronic distance measuring means 20, a display 38 and an operating device 40. During a measurement of distance, the distance measuring means 20 detects a distance between the distance measuring means 20 and a measurement object (not illustrated in more detail). For this purpose, it has a laser (not illustrated in more detail) which emits a laser beam 32. The measurement object reflects a portion of the laser beam 32 during the measurement of distance. A sensor (not illustrated in more detail) of the distance measuring means 20 detects a portion of the reflected light of the laser beam 32.

The arithmetic logic unit 16 has a computing routine which determines the distance by means of the laser beam 32. The arithmetic logic unit 16 in this case evaluates a propagation time, a phase angle and/or an amplitude of the portion of the reflected light of the laser beam 32. The arithmetic logic unit 16 constitutes a value of the distance for the operator on the display 38. An operator controls the measuring device 14 by means of the operating device 40. The measuring device 14 can be used separately from the measuring bar 12 in order to measure a distance. Alternatively or in addition, a measuring bar could be designed to enable a distance to be measured with the aid of a coupled measuring device 14.

During operation, the inclination measuring means 18 detects an alignment of the measuring device 14 and, if appropriate, of the measuring bar 12 relative to a direction of gravity. To this end, the inclination measuring means 18 detects an acceleration value in three directions aligned at right angles to one another. Alternatively, an inclination measuring means could also determine only acceleration values in two directions aligned at right angles to one another. The inclination measuring means 18 determines a direction of gravity by detecting gravity acting on a mass. The arithmetic logic unit 16 evaluates the alignment determined by the inclination measuring means 18. During a distance measuring operation, the arithmetic logic unit 16 signals to the operator an alignment of the laser beam 32 that is horizontal, vertical and/or some other predetermined alignment.

The system has a coupling device 22. At least for a measuring of inclination on a measurement object, the coupling device 22 couples the measuring bar 12 and the measuring device 14 so as to be releasable by an operator without any tools and without destruction. The measuring bar 12 has a main extent 24 which is approximately four times as large as a main extent 26 of the measuring device 14. The main extent 24 of the measuring bar 12 is approximately 60 cm. The measuring bar 12 has three stop surfaces 34 which are aligned parallel to the main extent 26. A first and a second of the stop surfaces 34 are aligned at right angles to a third one of the stop surfaces 34. The stop surfaces 34 extend substantially along the entire main extent 24 of the measuring bar 12.

The measuring bar 12 has a recess 42 and a coupling means 28 of the coupling device 22. At least during a measurement of inclination on a measurement object, the coupling means 28 fastens the measuring device 14 on the measuring bar 12. In a coupled operating state, the measuring device 14 is arranged in the recess 42 of the measuring bar 12, as a result of which the measuring device 14 is advantageously protected. In this case, the coupling means 28 fixes the measuring device 14 in the recess 42. The coupling means 28 has a rotatably mounted eccentric element (not illustrated here in more detail), and an operating element 44 with the aid of which the operator can rotate the eccentric element. A rotation of the operating element 44 acts to change a fastening force which acts on the measuring device 14 by means of the eccentric element and fastens the measuring device 14 at least non-positively. The measuring bar 12 has two spirit levels 46, thus enabling the measuring bar 12 to be used as a conventional water level without the measuring device 14.

The measuring device 14 has a bar detecting means 30. During operation, the bar detecting means 30 provides an information item relating to a coupling to the measuring bar 12. The information indicates whether the measuring bar 12 is coupled to the measuring device 14. The arithmetic logic unit 16 activates an angle measuring mode as a function of the information. In the angle measuring mode, the arithmetic logic unit 16 firstly represents an alignment of the system 10 on the display 38.

The bar detecting means 30 determines the information with the aid of the laser beam 32. To this end, the bar detecting means 30 measures the distance. The bar detecting means 30 detects the bar when the measuring device 14 is switched on. Alternatively, the bar detecting means 30 could detect the bar periodically. The measuring bar 12 has an optical means 36 which directs the laser beam 32 so as to detect a coupling. The optical means 36 has two reflecting surfaces 48, 50. In a coupled operating state, the reflecting surfaces 48, 50 direct the laser beam 32 from the laser to the sensor over a defined distance, in particular less than 8 cm. The arithmetic logic unit 16 uses the received laser beam 32 to determine whether the measuring bar 12 and the measuring device 14 are coupled. For this purpose, in addition to the distance the arithmetic logic unit 16 advantageously evaluates an amplitude of the received laser beam 32.

During measurement of an inclination, the arithmetic logic unit 16 determines a used stop surface 34 as a function of a parameter of the inclination measuring means 18. The arithmetic logic unit 16 adjusts a reading of the display 38 as a function of the stop surface 34 used. In addition, the operator can use the operating device 40 to change an adjustment of the reading of the display 38.

The arithmetic logic unit 16 has a memory (not illustrated in more detail here) which comprises two calibration data sets for calibrating the inclination measuring means 18. A first of the two calibration data sets serves for calibration when the measuring bar 12 and the measuring device 14 are decoupled. A second of the two calibration data sets serves for calibration when the measuring bar 12 and the measuring device 14 are coupled. The arithmetic logic unit 16 automatically loads the appropriate calibration data set. The arithmetic logic unit 16 has a calibration routine. During a calibration operation, the calibration routine creates one of the two calibration data sets. For this purpose, the calibration routine uses a method which appears sensible to the person skilled in the art, but advantageously measurement of a 180 degrees change, a measurement of a known, in particular horizontal alignment and/or a shaking calibration.

The invention claimed is:

1. A measuring system comprising:
   a measuring bar;
   a measuring device including at least one arithmetic logic unit, an inclination measuring device, and an electronic distance measuring device;
   a coupling device configured to releasably couple the measuring bar and the measuring device; and
   a bar detecting device configured to provide at least one information item relating to a coupling of the measuring device to a measuring bar,
   wherein the bar detecting device is configured to determine the at least one information item with the aid of the electronic distance measuring device.

2. The measuring system as claimed in claim 1, wherein:
   the measuring bar defines a bar main extent,
   the measuring device defines a device main extent, and
   the bar main extent is at least twice as large as the device main extent.

3. The measuring system as claimed in claim 1, wherein:
   the coupling device includes a coupling fastener positioned on the measuring bar, and
   the coupling fastener is configured to fasten the measuring device on the measuring bar.

4. The measuring device of claim 1, wherein the measuring device is configured to measure distance using a laser beam.

5. A measuring device of a measuring system comprising:
   at least one arithmetic logic unit;
   an inclination measuring device; and
   an electronic distance measuring device,
   a bar detecting device configured to provide at least one information item relating to a coupling of the measuring device to a measuring bar, and wherein the bar detecting device is configured to determine the at least one information item with the aid of the electronic distance measuring device.

6. The measuring device as claimed in claim 5, wherein the at least one arithmetic logic unit is configured to determine a stop surface with reference to a parameter of the inclination measuring device.

7. The measuring device as claimed in claim 5, wherein the arithmetic logic unit configured to activate an angle measuring mode as a function of the at least one information item.

8. The measuring device as claimed in claim 5, wherein the arithmetic logic unit includes at least one memory configured to store at least one calibration data set for calibrating the inclination measuring device.

9. The measuring device as claimed in claim 8, wherein the arithmetic logic unit is configured to perform at least one calibration routine to generate a calibration data set of the at least one calibration data set for calibrating the inclination measuring means.

10. A measuring bar of a measuring system comprising:
a coupling fastener configured to fasten a measuring device on the measuring bar, wherein the measuring bar defines a bar main extent which is at least twice as large as a device main extent defined by the measuring device; and
an optical device configured to direct a laser beam so as to detect a coupling of the measuring bar and the measuring device.

11. The measuring bar as claimed in claim 10, further comprising:
a recess configured to support the measuring device in at least one operating state.

* * * * *